United States Patent Office 3,110,406
Patented Nov. 12, 1963

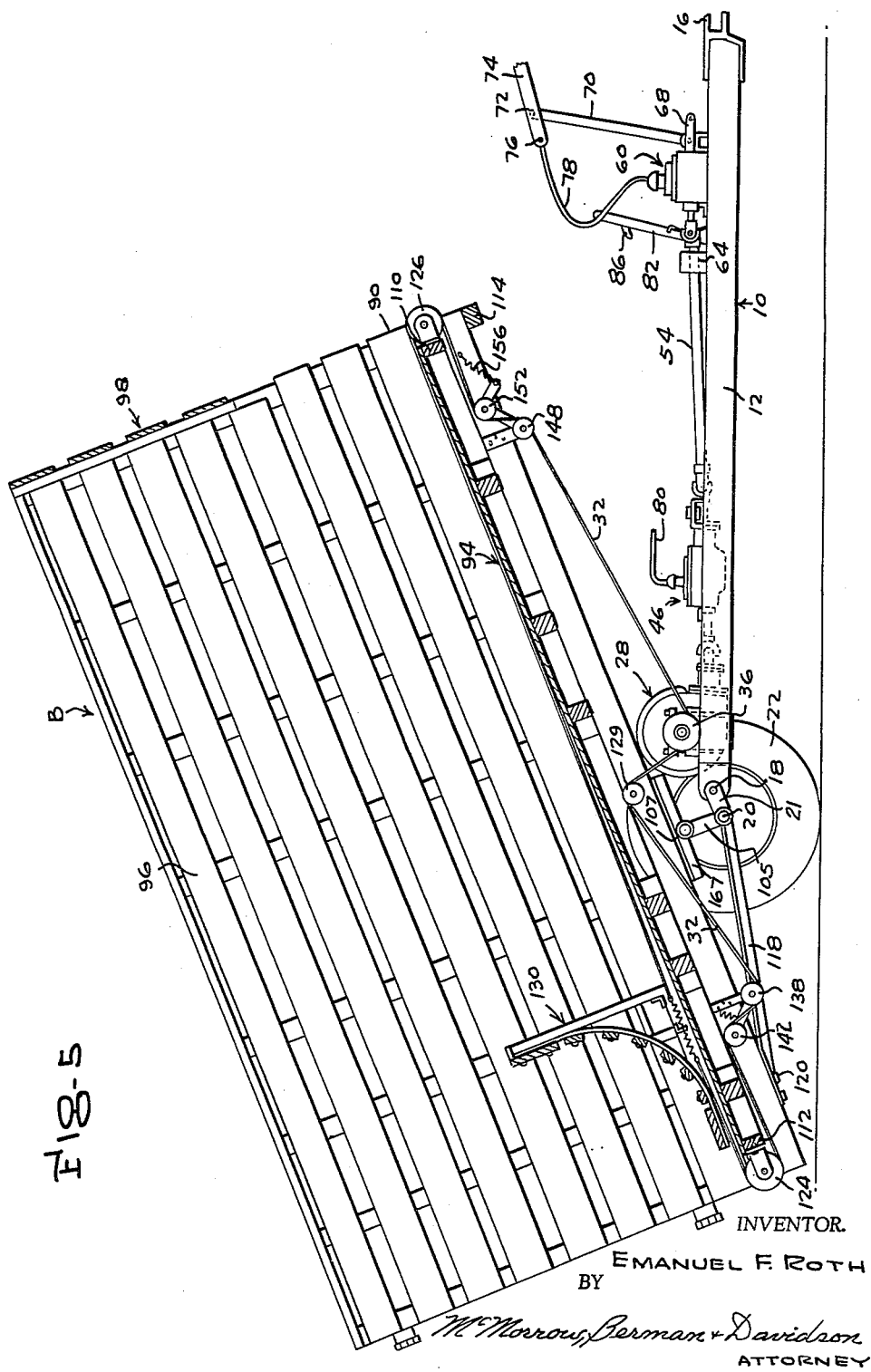

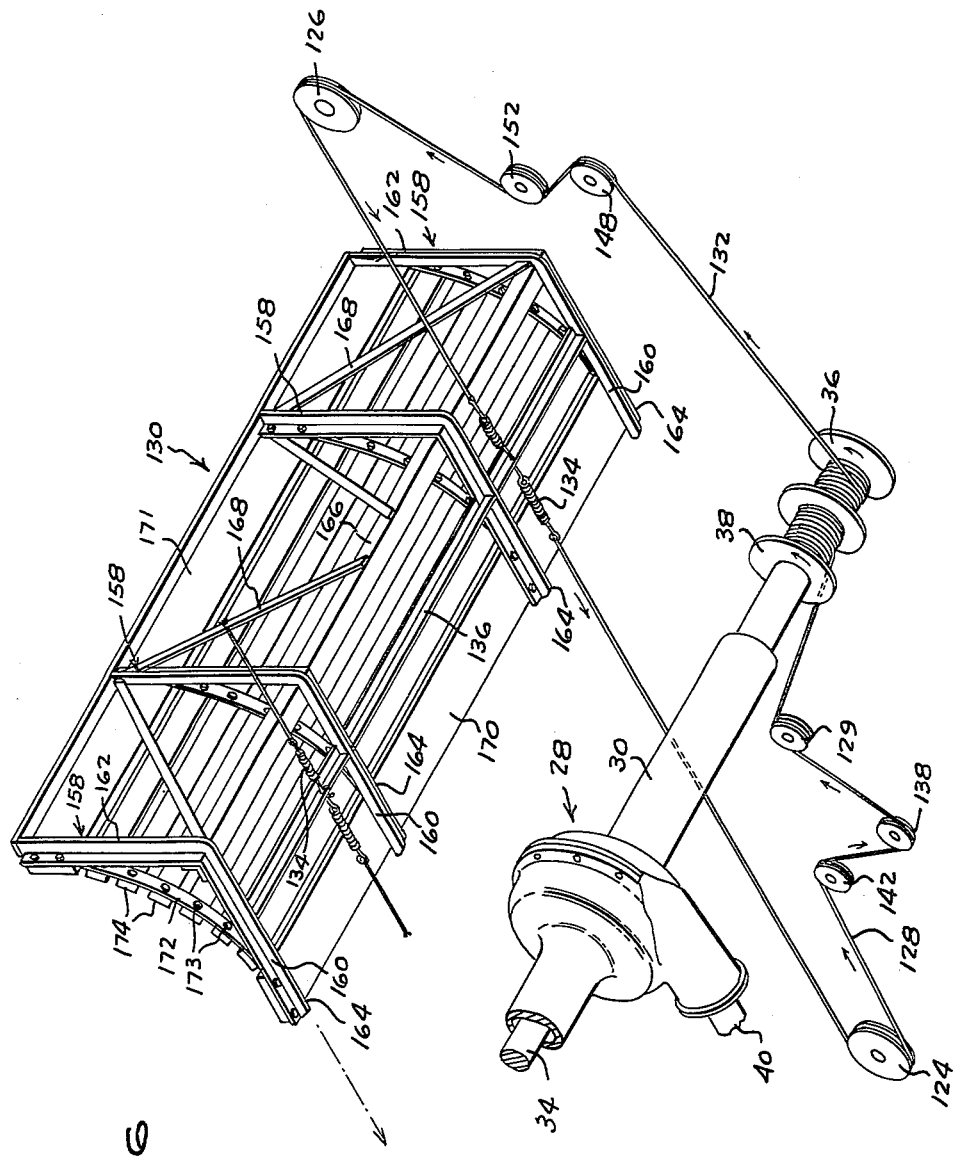

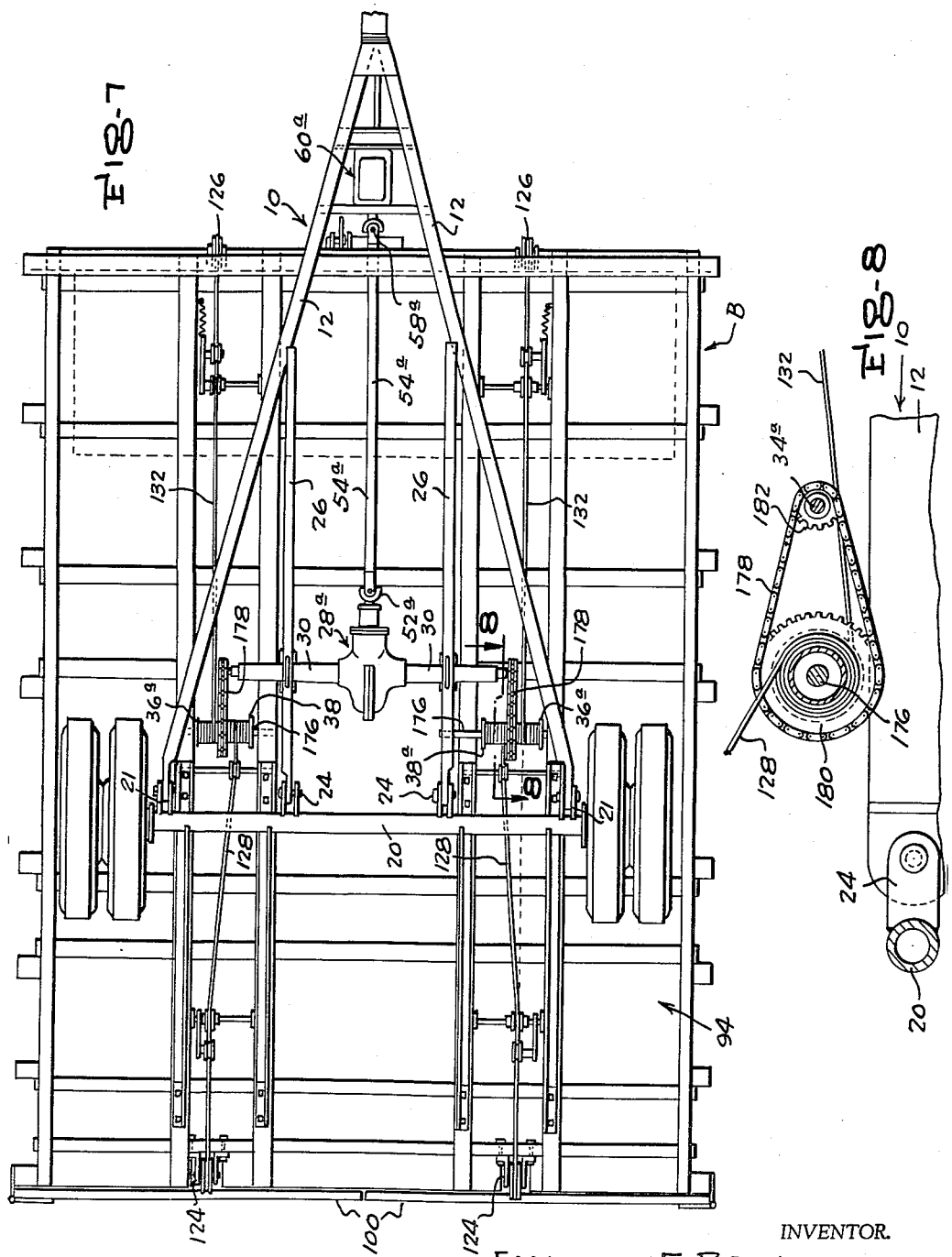

3,110,406
SELF-UNLOADING VEHICLE
Emanuel F. Roth, Bentley, N. Dak.
Filed Aug. 31, 1962, Ser. No. 220,643
6 Claims. (Cl. 214—510)

This invention relates to novel self-unloading vehicles having tiltable bodies wherein unloading pushers or scoops operate in conjunction with the tilting of the bodies for unloading the same.

The primary object of the invention is the provision of generally improved vehicles of the kind indicated wherein the tiltings of the bodies and the movements of the pushers or scoops therein are power operated, as from the power takeoff shaft of a tractor, or other source of power, and wherein simplified operator actuated control means is provided which provides for tilting of the bodies and operation of the scoops or pushers, from retracted starting positions to full operated positions and return to their starting positions, and automatic locking of the scoops or pushers in their starting positions, upon return thereto, as the bodies subside to horizontal positions, and return of the power transmission means to the neutral position thereof, whereby much time and labor-consuming work otherwise required is eliminated.

Other important objects and advantageous features of the invention will be apparent from the following description and the accompanying drawings, wherein, for purposes of illustration only, a specific form of the invention is set forth in detail.

In the drawings:

FIGURE 5 is a right-hand side elevation of the trailer-body assembly, partly in vertical longitudinal section, showing the body tilted rearwardly, relative to the trailer chassis frame, and the pusher or scoop at the end of the fully operated unloading position;

FIGURE 6 is an enlarged, fragmentary schematic perspective view showing details of the scoop or pusher and the operative relationship of differential carried winch means and the cable means wound thereon to the scoop or pusher;

FIGURE 7 is a bottom plan view, like FIGURE 2, showing another embodiment of the present invention, involving a single transmission; and, FIGURE 8 is an enlarged fragmentary vertical longitudinal section taken on the line 8—8 of FIGURE 7.

Figure 1:
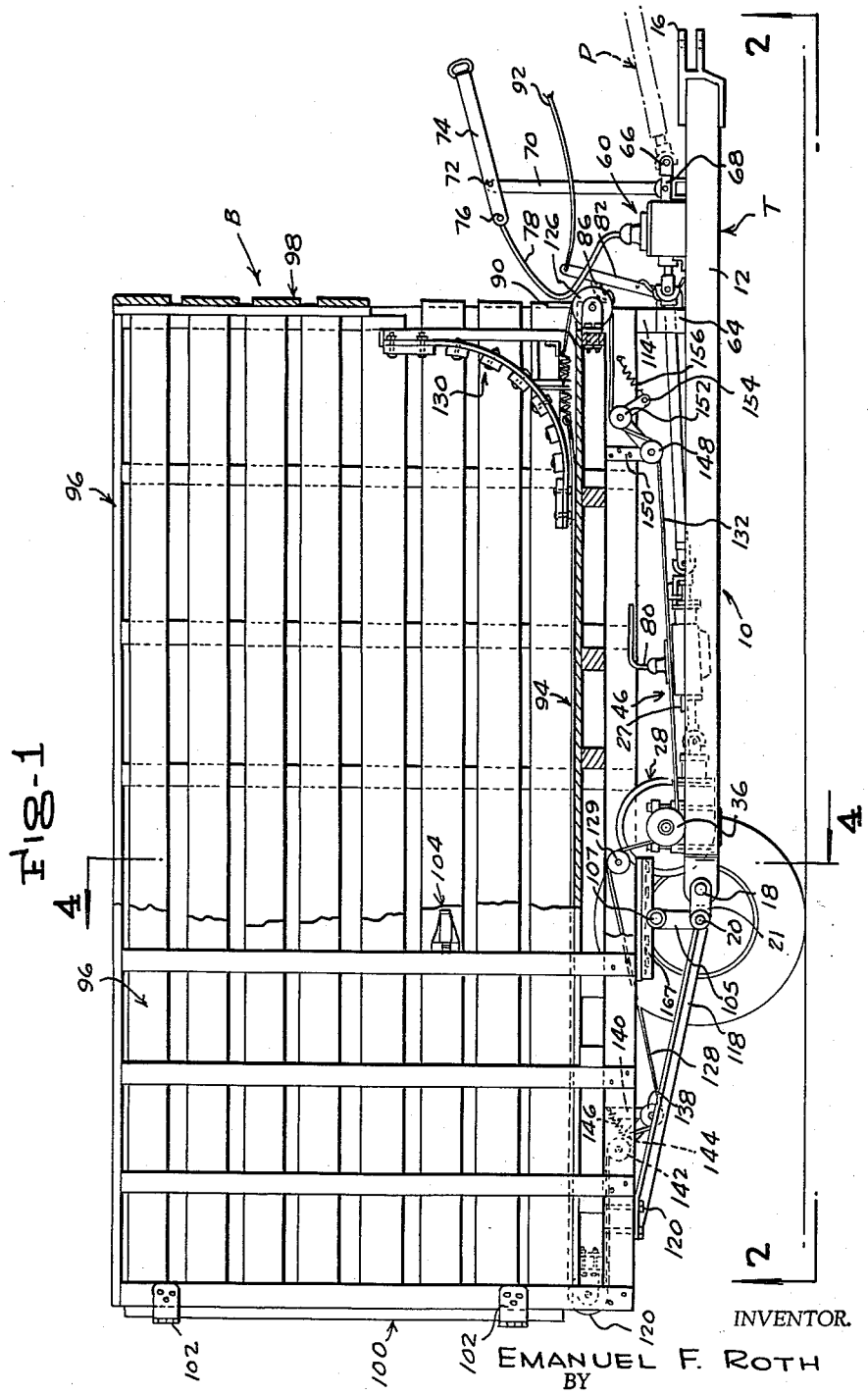
FIGURE 1 is a right-hand side elevation, partly broken away and in section, of a two-wheel tractor drawn trailer vehicle embodying a body of the present invention, the body being shown in untilted horizontal position and the scoop or pusher locked in retracted or starting position.
Figure 2:
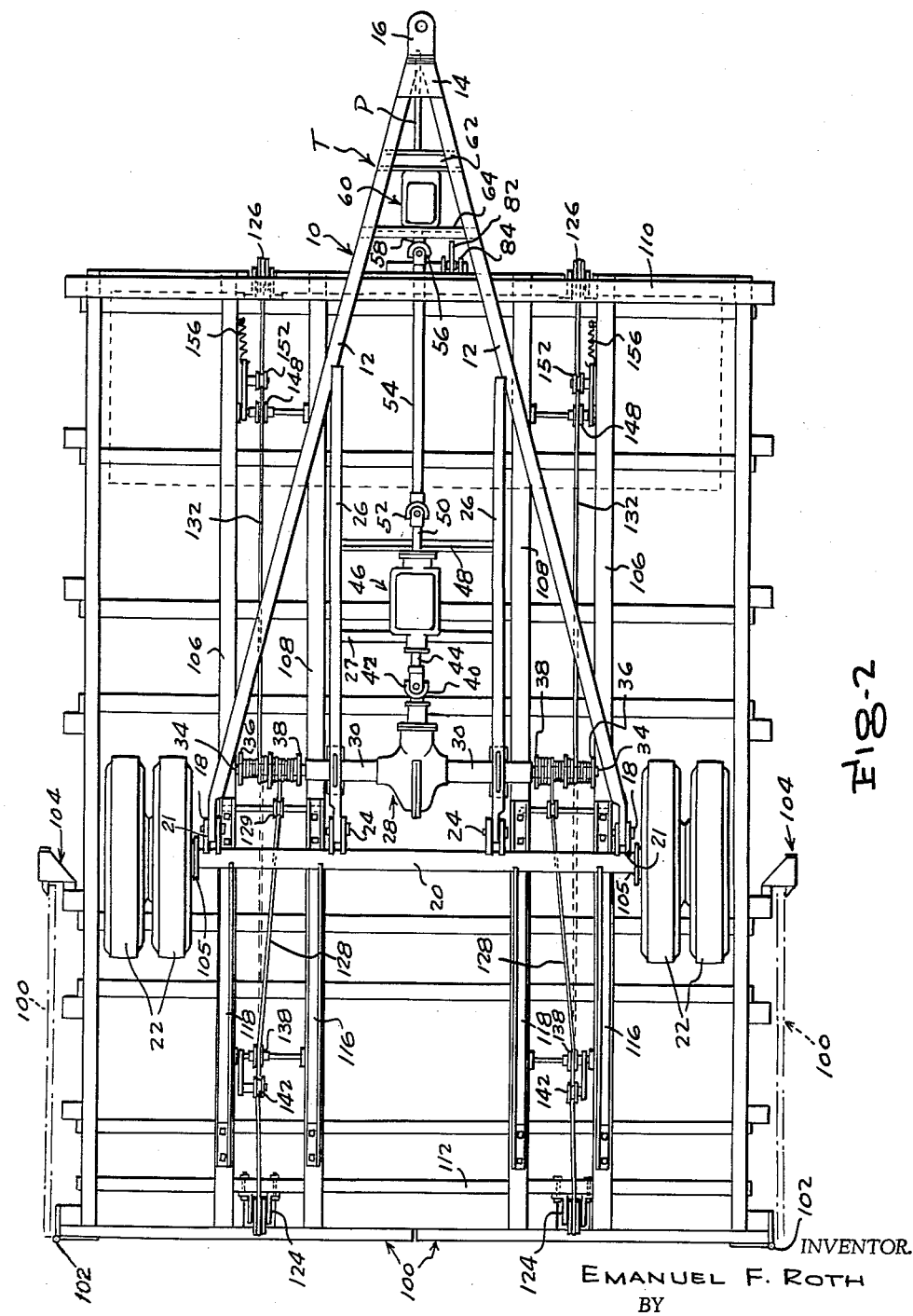
FIGURE 2 is a bottom plan view of FIGURE 1, showing the tail gates of the body in closed position, in full lines, and held in open positions, in phantom lines.
Figure 3:
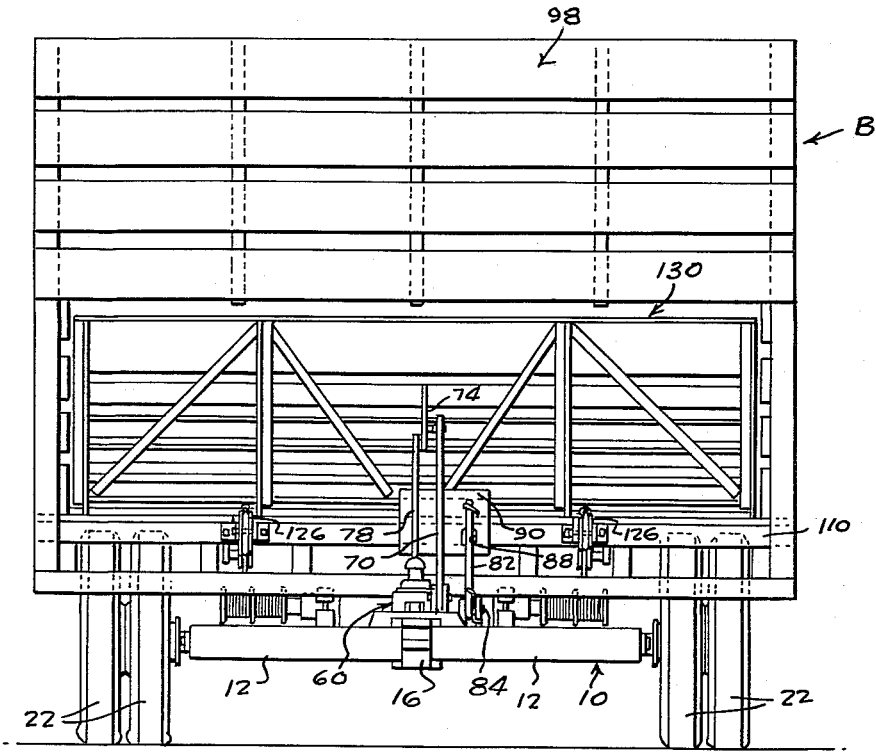
FIGURE 3 is a front end elevation of FIGURE 1.
Figure 4:
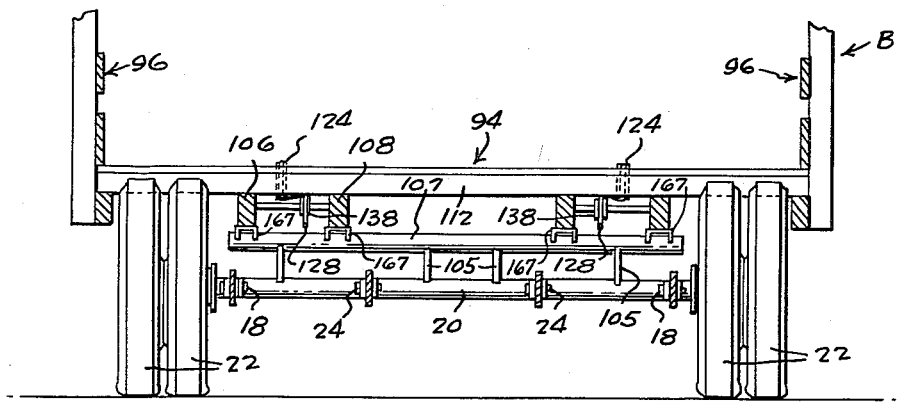
FIGURE 4 is a fragmentary vertical transverse section taken on the line 4—4 of FIGURE 1.

Referring in detail to the drawings, wherein like and related numerals designate like and related parts throughout the several views, and first to FIGURES 1 through 6 thereof, there is shown a vehicle T, herein shown as being a two-wheeled trailer, adapted to be drawn by a tractor (not shown) having a power takeoff shaft P, with a body B, in accordance with the present invention, mounted on the trailer T. It will be understood that the body B is also adapted to be mounted upon and operated from supports and from vehicles other than trailers.

The trailer T comprises a rearwardly flaring, V-shaped horizontal chassis frame 10, having rearwardly divergent side members 12 connected together, at their forward ends, as indicated at 14, and terminating in a forwardly extending drawbar 16, adapted to be secured to the coupling of a tractor (not shown). At their rear ends, the side members 12 are articulated or connected to a transverse axle 20 for pivotal movement relative to said axle as by pivotally attaching the rear ends of the side members 12 to spaced ears 21 projecting from the axle 20, at locations adjacent to the inward sides of ground-engaging wheels 22 on the axle, the axle 20 being spaced behind the rear ends of the side members 12. Similarly articulated or connected to the transverse axle 20 for pivotal movement relative to said axle are the rear ends of longitudinal parallel spaced inner chassis members 26 as by pivotally attaching the rear ends of the members 26 to other spaced ears 21 provided on the axle 20 and indicated at 24, the members being spaced and connected by a cross bar 27, which are suitably fixed, at their forward ends, to the side members 12, at points spaced rearwardly from the forward ends thereof. A differential 28 is positioned between the inner side members 26, adjacent their rear ends, and has aligned tubular arms 30 resting upon and clamped to the members 26, as indicated at 32. The shafts 34 extending out of the arms 30 carry cable drums which have outer and inner portions 36 and 38, respectively.

The forwardly extending driven shaft 40 of the differential 28 is connected by a universal joint 42 to the rearwardly extending shaft 44 of a rear change-speed transmission 46 which is fixedly mounted on a rear cross member 48, which extends between and is fixed to the inner chassis frame members 26. The rear transmission 46 has a forwardly extending shaft 50 which is coupled by a universal joint 52, to the rear end of a drive shaft 54, which is coupled by a universal joint 56, to the rearwardly extending shaft 58 of a forward change-speed transmission 60, which is supported on and located between forward and intermediate cross members 62 and 64, respectively, extending between the chassis frame side members 12, adjacent to their forward ends. The employment of two coupled transmissions provides for a substantial reduction in gear ratio between the tractor power takeoff shaft P and the differential 28. The power takeoff shaft P is coupled by a universal joint 66 to the forwardly extending shaft 68 of the forward transmission 60. A standard 70 is fixed to and rises from the forward cross member 64, in line with the forward transmission 60, on which is pivoted, as indicated at 72, a generally horizontal operating lever 74, which is pivoted, at its rear end, as indicated at 76, to the upper end of a shift lever 78, upstanding from the transmission 60, whereby a tractor operator can reach back, from his seat on a tractor, and manipulate the operating lever 74 for changing gears in the transmission 60. The rear transmission 46 has thereon an upstanding shift lever 80 which is adapted to be used to set the rear transmission in a desired semi-permanent gear ratio. The intermediate cross member 64 is fixed upon the upper surfaces of the chassis frame side members 12, and rises thereabove, to serve as a bolster upon which the forward part of the body B is adapted to rest, in its untilted horizontal position. An upstanding rearwardly spring-pressed body latch bar 82 is pivoted, at its lower end, as indicated at 84, in FIGURE 2, on the forward side of the intermediate cross member 64, and has, intermediate its ends, a rearwardly and downwardly curved detent hook 86, which is adapted to be engaged through an opening 88, provided in a vertical detent plate 90, on the forward end of the body B, for holding the body down in place. An operating cord 92 extends forwardly from the upper end of the latch bar 82, and enables the tractor operator to release the latch bar from his seat on the tractor. The curved upper surface of the detent hook 86 is engaged by the upper end of the opening 88, as the body B subsides from a tilted position, so that the hook is urged into the opening 88.

The body B comprises a flat bed 94, upstanding side walls 96, and an elevated and abbreviated front wall 98, extending between and fixed to the side walls and spaced above the bed 94. The body B is open, at its rear end, and has a pair of vertical axis tail gates 100 hinged on the outer sides of the side walls 96, at their rear ends, as indicated at 102, so as to be swingable from closing relation to the rear end of the body, to out-of-the-way opening positions, along the outer sides of the side walls, where they are releasably secured, as by means of spring-pressed latches 104 on the side walls. The rear end of the body B is connected to the axle 20 for movement responsive to rotation of the axle from the horizontal position to an elevated dumping position. The body is supported upon the axle 20 by means of cross bar 107 having pendant vertical arms 105 which are fixed to the axle so that the body B tilts on the axis of the articulations 18 and 24.

The bed 94 of the body B includes laterally spaced pairs of longitudinal, outer and inner members 106 and 108, respectively, and a front and rear cross member 110 and 112, at the forward and rear ends, respectively, of the bed 94 and suitably affixed to the members 106 and 108. The outer and inner members 106 and 108 are fixed to saddles 167 fixedly carried by the cross bar 107. Adjacent to the front cross member 110 a centered bolster 114 is fixed to the undersides of the longitudinal members, which is adapted to rest upon the trailer chassis frame cross member 64, in the untilted position of the body B. Angle iron longitudinal braces 116 and 118, underlie the inner members 106 and 108, respectively, and are fixed thereto, at the rear ends thereof, as indicated at 120, and at their forward ends to the axle 20.

The rear cross member 112 of the body bed 94 serves as a mounting for rear pulleys 124 which are positioned midway between the pairs of members 106 and 108. Front pulleys 126 are mounted on the front cross member 110, substantially in line with the rear pulleys 124. Rear cables 128 are trained upwardly around the rear pulleys 124 from idler pulleys 129 supported on the members 106 and 108, from the inner drum sections 38 on which they are wound, and are secured, at their forward ends to a scoop or pusher 130. Forward cables 132 are wound upon the outer drum sections 36 and extend forwardly to and upwardly around the front pulleys 126 and have their rear ends connected to the scoop or pusher 130, the cables 128 and 132 being wound in opposite directions on the drums, so that as the body B is tilted upwardly and rearwardly to elevated dumping position, the scoop or pusher is moved rearwardly along the body bed 94 and scoops or pushes material in the body out through the open rear end of the body; and so that, when the forward transmission 60 is reversed, the body B subsides toward the trailer chassis frame, and the scoop or pusher 130 is moved forwardly on the body bed toward its retracted starting position. As the body B reaches normal horizontal position, the hook of the latch bar 82 automatically engages through the opening 88 of the plate 90.

As shown in FIGURE 5, the connections of the cables 128 and 132 with the scoop or pusher 130 are cushioned by means of contractile coil springs 134, to whose ends they are severally secured, the springs being secured, intermediate their ends, to a cross bar 136 at the underside of the pusher.

The rear cables 128 are maintained under proper tension by being passed under idler pulleys 138, on the lower ends of pendant brackets 140 on and between the longitudinal chassis frame members 106 and 108, and over tightener pulleys 142 journaled on pivotally supported arms 144, which are biased forwardly and upwardly by springs 146.

The forward cables 132 are maintained under proper tension by being passed under idler pulleys 148 on pendant brackets 150 and over tightener pulleys 152 on pivotally supported arms 154 which are biased upwardly and rearwardly by springs 156.

As shown in detail in FIGURE 6, the pusher 130, which closes the space beneath the abbreviated front wall 98 of the body B, in the retracted starting position of the pusher, comprises a transversely elongated L-shaped form which is made up of transversely spaced L-shaped angle irons 158 having horizontal, rearwardly extending foot portions 160 and erect upstanding standards 162. The foot portions 160 have downwardly extending vertical flanges 164 which act as runners which slide forwardly and rearwardly upon the body bed 94. The above-mentioned cross bar 136 is fixed to all of the foot portions 160, and an angle cross member 166 is fixed to all of the angle irons 158, at the meetings of their standards and foot portions. Diagonal braces 168 extend between the cross member 166 and the standards. A foot board 170 is fixed upon the foot portions 160, at their forward ends and a head board 171 on the standards, at their upper ends. Concavely curved bands 172 extend between and are fixed, at their depressed rearward ends and their forward elevated ends, to the foot portions 160 and the standards 162, at the upper ends thereof, and relatively closely spaced transverse slats 174 are fixed, as indicated at 173 to the rearward surfaces of the bands 172, to constitute a concavely curved material-engaging pusher surface, which acts to scoop up and elevate material from the body bed 94, and push the same rearwardly in the body, as the pusher 130 is moved rearwardly therein. The rearward operation of the pusher 130 can be substantially simultaneous with the upward and rearward tilting of the body B or the arrangement can be made that the pusher is put into action after the body B has attained a predetermined amount of tilt. Upon completion of an unloading operation, the tractor operator shifts the forward transmission 60 into reverse, so as to produce downtilting of the body B and return of the pusher 130 to its starting position.

The form of the invention shown in FIGURES 7 and 8, is similar to that of FIGURES 1 through 6, as above described, except that only a single forward transmission 60$^a$ is used, and which is connected by the drive shaft 54$^a$ directly to the differential 28$^a$ by universal joints 56$^a$ and 52$^a$. The dual section drums are mounted on shafts 176 journaled on and extending between the pairs of longitudinal body members 106$^a$ and 108$^a$, behind the differential 28$^a$, the drums being driven by sprocket chains 178 trained over sprocket wheels 180, on the drums between their sections 36$^a$ and 38$^a$ and over sprocket wheels 182 on the differential shafts 34$^a$. This single transmission arrangement is adequate for the handling and unloading of relatively small or relatively light weight material in the body B.

Although there have been shown and described preferred forms of the invention, it is to be understood that the invention is not necessarily confined thereto, and that any change or changes in the structure of and in the relative arrangements of components thereof are contemplated as being within the scope of the invention as defined by the claims appended hereto.

What is claimed is:

1. A self-unloading vehicle comprising a wheeled support having a differential thereon having lateral shafts, a body pivoted on the support and having a bed, a pusher sliding longitudinally upon said bed, said bed having front and rear pulley means thereon at opposite sides of its pivotal axis of the body, rotary drum means mounted on the support in line with the pulley means, means operatively connecting the drum means to the differential shafts, said drum means having outer and inner sections, rear cable means wound around the inner drum sections and trained upwardly around the rear pulley means and connected to the pusher, forward cable means wound around the outer drum means sections and upwardly around the forward pulley means and connected to the pusher, and means for driving the differential, said driving means comprising a single reversible forward transmission on said support and connected directly to the differential, said connecting means comprising sprocket wheels on the drum means and on the differential shafts, and sprocket chains trained around the sprocket wheels.

2. A self-unloading vehicle comprising a horizontally-disposed chassis frame having a front end and a rear end, a transversely-disposed wheel-supported axle positioned rearwardly of and adjacent the rear end of said frame, means connecting the rear end of said chassis frame to said axle for pivotal movement relative to said axle, a forwardly-extending drawbar on the front end of said chassis frame adapted to be secured to a towing vehicle, a body having a rear end which is open and comprising a flat bed, upstanding side walls rising from said bed, and having a front end which is closed by an elevated and abbreviated front wall extending between and fixed to the sidewalls and spaced above said bed, a pusher positioned transversely of the bed and within said body and normally facing toward the rear end of said body and bridging the part of the front end of said body between the abbreviated front wall and the bed and mounted on said bed for movement toward and to the rear end of said body and backward toward and to the front end of said body, said body being horizontally disposed upon said chassis frame so that it extends transversely over and above the wheel-supported axle with the portion adjacent the front end thereof extending longitudinally over and spaced above the portion of the chassis frame adjacent the rear end of said frame and the portion adjacent the rear end thereof extending longitudinally rearwardly from and beyond said axle, means connecting said body to said axle for movement of said body from the horizontal position to an elevated dumping position responsive to rotation of said axle, and means operatively connecting said body and pusher to said axle so that execution of the movement of said body from the horizontal position to the elevated dumping position causes simultaneous movement of said pusher from its normal position bridging the part of the front wall of said body toward and to the rear of said body and the execution of the movement of said body from the elevated dumping position to the horizontal position causes simultaneous movement of said pusher from the position at the rear end of said body toward and to its normal position bridging the part of the front end of said body.

3. The self-unloading vehicle according to claim 2 which includes in addition a cross member rising from said chassis frame on the front end thereof and carried by the frame, and a bolster depending from said body bed adjacent the front wall of said body freely resting upon said cross member and supporting the front end of said body when the latter is in its horizontal position.

4. The self-unloading vehicle according to claim 2 wherein said pusher is a scoop, and said scoop is mounted on said bed for sliding back-and-forth movement thereon.

5. The self-unloading vehicle according to claim 2 which includes in addition a latch means on said cross member and releasably engageable with means provided on the front end of said body for holding said body in a horizontal position.

6. The self-unloading vehicle according to claim 4 wherein the means connecting the scoop and body to the axle embodies cable and reel means.

References Cited in the file of this patent

UNITED STATES PATENTS

| | | |
|---|---|---|
| 2,298,982 | Smith | Oct. 13, 1942 |
| 2,463,643 | Recker | Mar. 8, 1949 |
| 2,512,339 | Knapp | June 20, 1950 |
| 2,617,683 | Strom | Nov. 11, 1952 |
| 2,624,484 | Dalton | Jan. 6, 1953 |
| 2,789,715 | Filipoff et al. | Apr. 23, 1957 |
| 2,909,295 | Weir | Oct. 20, 1959 |
| 3,012,682 | Williamson | Dec. 12, 1961 |
| 3,079,278 | Alexander | Feb. 12, 1963 |